(12) United States Patent
Oh

(10) Patent No.: US 11,130,444 B2
(45) Date of Patent: Sep. 28, 2021

(54) TRUCK STORAGE BOX WITH INTEGRATED LIGHTING AND POWER

(71) Applicant: WERNER CO., Greenville, PA (US)

(72) Inventor: Sang Oh, Lake Zurich, IL (US)

(73) Assignee: WERNER CO., Greenville, PA (US)

( * ) Notice: Subject to any disclaimer, the term of this patent is extended or adjusted under 35 U.S.C. 154(b) by 21 days.

(21) Appl. No.: 16/654,337

(22) Filed: Oct. 16, 2019

(65) Prior Publication Data

US 2020/0122636 A1  Apr. 23, 2020

Related U.S. Application Data

(60) Provisional application No. 62/747,458, filed on Oct. 18, 2018.

(51) Int. Cl.

| | |
|---|---|
| *B60R 11/06* | (2006.01) |
| *B60R 9/06* | (2006.01) |
| *B60Q 3/30* | (2017.01) |
| *B60R 9/00* | (2006.01) |
| *B60L 1/16* | (2006.01) |
| *B60R 11/00* | (2006.01) |
| *B60R 11/02* | (2006.01) |

(52) U.S. Cl.
CPC ............ *B60Q 3/30* (2017.02); *B60L 1/16* (2013.01); *B60R 9/00* (2013.01); *B60R 11/06* (2013.01); *B60R 11/0241* (2013.01); *B60R 11/0252* (2013.01); *B60R 2011/004* (2013.01)

(58) Field of Classification Search
CPC .. B60R 9/00; B60R 9/06; B60R 9/065; B60R 11/06; B60L 1/16; B60Q 3/30
See application file for complete search history.

(56) References Cited

U.S. PATENT DOCUMENTS

| | | | | |
|---|---|---|---|---|
| 2,101,748 | A | * | 12/1937 | Michel ................... B60Q 3/30 362/496 |
| 4,054,789 | A | * | 10/1977 | Romanelli ............. B60Q 1/52 362/542 |
| 4,210,888 | A | * | 7/1980 | Holce ............... H01H 36/0026 335/153 |
| 4,691,470 | A | * | 9/1987 | Landell ................ A01K 97/06 362/191 |
| 5,137,322 | A | | 8/1992 | Muirhead |
| 5,299,722 | A | * | 4/1994 | Cheney ................... B60R 7/14 206/317 |
| 5,484,092 | A | * | 1/1996 | Cheney ................... B60R 7/14 206/317 |

(Continued)

OTHER PUBLICATIONS

Amazon.com search result, "Amazon.com: 2nd Gen White Truck Bed Tool Box Light Kit with Auto-off Delay Switch 4pc 12inch Tubes: Automotive," https://www.amazon.com/WHITE-Truck-Auto-off-Switch-12inch/dp/B00QG7XT86, retrieved from the internet on Aug. 20, 2018.

*Primary Examiner* — Justin M Larson
(74) *Attorney, Agent, or Firm* — McDonnell Boehnen Hulbert & Berghoff LLP

(57) ABSTRACT

A truck storage box with integrated lighting and power is disclosed. In one embodiment, the lighting is a light assembly including a light emitting diode (LED) strip that is powered by drawing vehicle electrical power from a truck to trailer electrical socket of the vehicle, and routes the electrical power into the truck storage box mounted on the vehicle.

14 Claims, 9 Drawing Sheets

(56) References Cited

U.S. PATENT DOCUMENTS

| | | | |
|---|---|---|---|
| 5,727,835 A * | 3/1998 | Krush | B60R 9/00 224/404 |
| 5,732,764 A | 3/1998 | Douglas et al. | |
| 5,905,356 A | 5/1999 | Wells | |
| 5,979,094 A | 11/1999 | Brafford, Jr. | |
| 6,065,942 A | 5/2000 | Glidden et al. | |
| 6,238,068 B1 | 5/2001 | Farmer, Jr. | |
| 6,401,994 B1 * | 6/2002 | Ham | B60R 7/14 109/51 |
| 6,428,191 B2 * | 8/2002 | Ohura | B62J 6/00 362/154 |
| 6,571,949 B2 | 6/2003 | Burrus, IV et al. | |
| 6,596,941 B2 | 7/2003 | Tripoli | |
| 6,672,641 B2 | 1/2004 | Hodge | |
| 7,170,035 B2 | 1/2007 | Peterson et al. | |
| D541,450 S * | 4/2007 | Cheng | D26/31 |
| 7,462,951 B1 | 12/2008 | Baarman | |
| 8,038,195 B1 | 10/2011 | Hutcheson | |
| 8,281,967 B2 | 10/2012 | Evans | |
| 8,854,201 B1 | 10/2014 | Hertz et al. | |
| 9,193,307 B2 * | 11/2015 | Roach | B60R 11/06 |
| 9,205,774 B2 | 12/2015 | Kennemer et al. | |
| 9,694,754 B2 * | 7/2017 | Sterling | B60R 5/04 |
| 9,783,129 B2 * | 10/2017 | Roach | B60R 9/065 |
| 9,815,402 B1 | 11/2017 | Salter et al. | |
| 10,000,165 B2 | 6/2018 | Reed, III | |
| 10,166,930 B2 * | 1/2019 | Aftanas | B60R 9/065 |
| 10,458,627 B2 * | 10/2019 | Perez-Bolivar | B60Q 3/70 |
| 10,661,842 B2 * | 5/2020 | Povinelli | B60R 7/005 |
| 10,843,239 B2 * | 11/2020 | Liebsch | G01G 21/286 |
| 2004/0008517 A1 * | 1/2004 | Bixler | H01H 35/022 362/394 |
| 2007/0252435 A1 | 11/2007 | Coe et al. | |
| 2008/0205045 A1 * | 8/2008 | Herper | F21V 33/0016 362/133 |
| 2014/0198510 A1 | 7/2014 | Law et al. | |
| 2014/0266001 A1 | 9/2014 | Wilde | |
| 2015/0204526 A1 * | 7/2015 | Nilvius | B60Q 3/30 362/154 |
| 2016/0009232 A1 | 1/2016 | Budny | |
| 2016/0311377 A1 | 10/2016 | Aftanas et al. | |
| 2017/0349106 A1 * | 12/2017 | Zajicek | B60R 9/02 |
| 2018/0037161 A1 | 2/2018 | Wymore | |
| 2018/0134204 A1 | 5/2018 | Aplin | |
| 2018/0164147 A1 * | 6/2018 | Liebsch | B01L 1/04 |
| 2019/0111854 A1 * | 4/2019 | Abel-Bey | B60R 7/02 |
| 2020/0122636 A1 * | 4/2020 | Oh | B60Q 3/30 |
| 2020/0180707 A1 * | 6/2020 | Johnson | B62D 33/0273 |
| 2020/0290525 A1 * | 9/2020 | Viniegra | B62D 33/0273 |
| 2021/0078488 A1 * | 3/2021 | Scherer | F21S 45/50 |
| 2021/0155164 A1 * | 5/2021 | Symonds | B60R 9/02 |
| 2021/0155296 A1 * | 5/2021 | Povinelli | B60R 11/00 |

* cited by examiner

TRUCK STORAGE BOX WITH INTEGRATED LIGHTING AND POWER

CROSS REFERENCE TO RELATED APPLICATIONS

The present application is a priority to U.S. Provisional Patent Application No. 62/747,458 filed Oct. 18, 2018, which is herewith incorporated by reference into the present application.

BACKGROUND

A. Field

This disclosure relates generally to truck storage boxes, and more particularly to a truck storage box having integrated lighting and power.

B. Description of Related Art

Truck storage boxes can be installed in pickup trucks for placing and storing tools and other electronic equipment. Some truck storage boxes include lighting to enable a user to find tools and other items easily. The lighting, as well as other known vehicle accessories, may use the power from the vehicle, and are controlled by the vehicle ignition switch. However, it may be difficult and/or burdensome to tap into the vehicle's electrical wiring harness for power. Alternatively, batteries can be used as a source of power for the lighting, but may fail unexpectedly.

SUMMARY

The following embodiments and aspects thereof are described and illustrated in conjunction with systems, tools and methods which are meant to be exemplary and illustrative, not limiting in scope.

In one aspect, a truck storage box is disclosed. The truck storage box includes an outer body, an interior, and a lid, the lid being connected to the outer body by a hinge. The truck storage box further includes a magnetic switch mounted within the interior, a magnet secured to the lid, and a lighting assembly secured to the interior. The lighting assembly is powered by a trailer electrical socket in communication with the truck storage box.

In another embodiment, a method of providing power to a truck storage box is disclosed. The method includes providing a truck storage box having a body defining an interior, and a lid, the lid being connected to the body by a hinge, the box further including a magnetic switch mounted within the interior, a magnet secured to the lid, and a lighting assembly secured to the interior of the truck storage box, connecting the interior of the truck storage box to a 7-pin trailer electrical socket, and providing DC power to the lighting assembly from the 7-pin trailer electrical socket.

In addition to the exemplary aspects and embodiments described above, further aspects and embodiments will become apparent by reference to the drawings and by study of the following detailed description.

BRIEF DESCRIPTION OF THE FIGURES

Exemplary embodiments are illustrated in the drawings. It is intended that the embodiments and figures disclosed herein are to be considered illustrative rather than restrictive.

DETAILED DESCRIPTION

A truck storage box having integrated lighting and power is disclosed. In one embodiment, the lighting comprises a light emitting diode (LED) strip that is powered by drawing vehicle electrical power from a truck to trailer electrical socket of the vehicle, and routing the electrical power into the truck storage box mounted on the vehicle. In one embodiment, the socket is a 7-pin truck to trailer electrical socket. In some embodiments, the electrical power from the trailer electrical socket may also provide power to electrical devices, recharge batteries, or drive an inverter, and the like. The connector which connects the truck storage box to the trailer electrical socket includes appropriate 7-pin sockets without interrupting electrical power and brake/turn signal input to a trailer.

Figure 1:
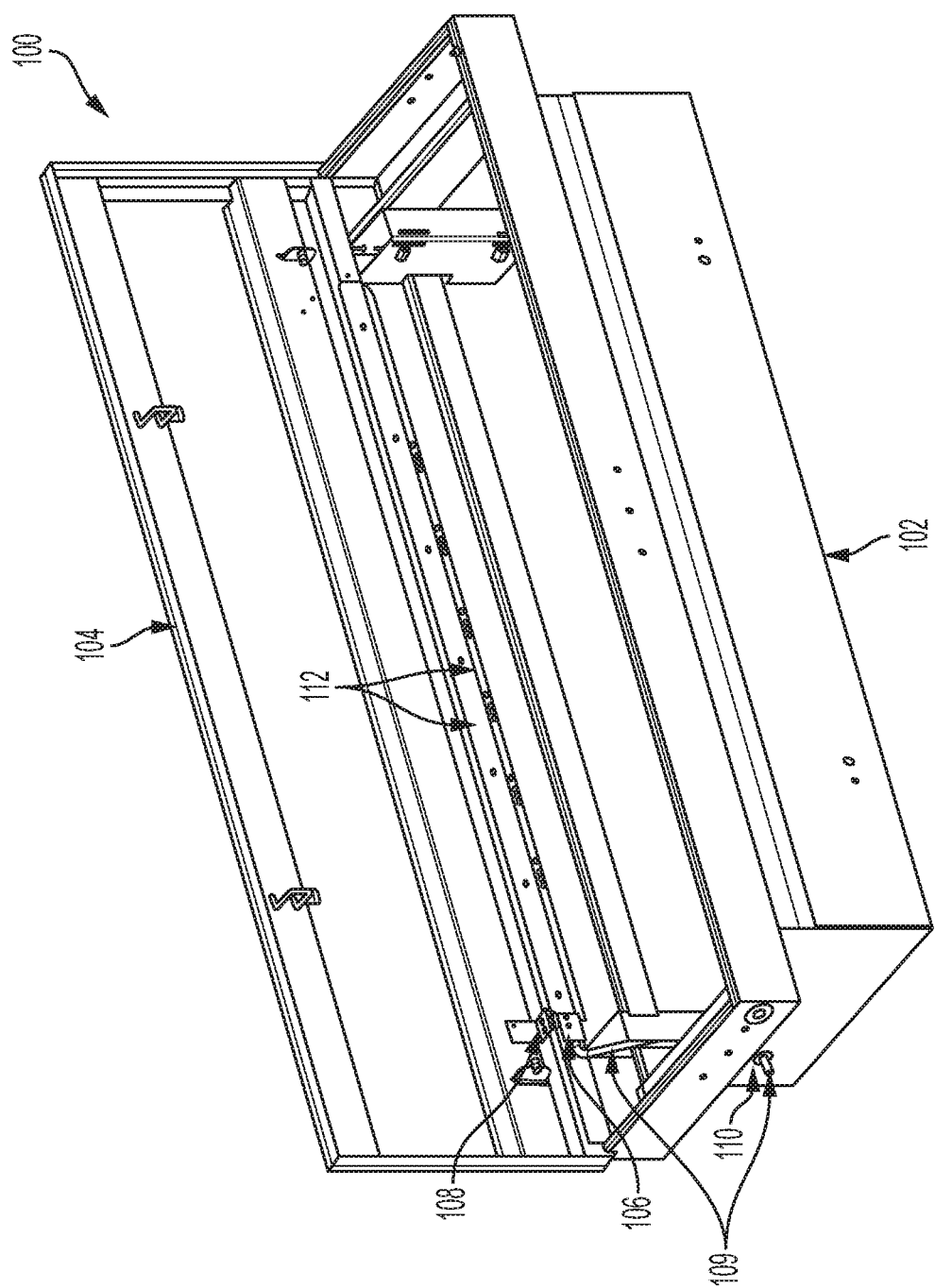
FIG. 1 is a perspective view of an example truck storage box with integrated lighting and power in accordance with an embodiment.
Figure 2:
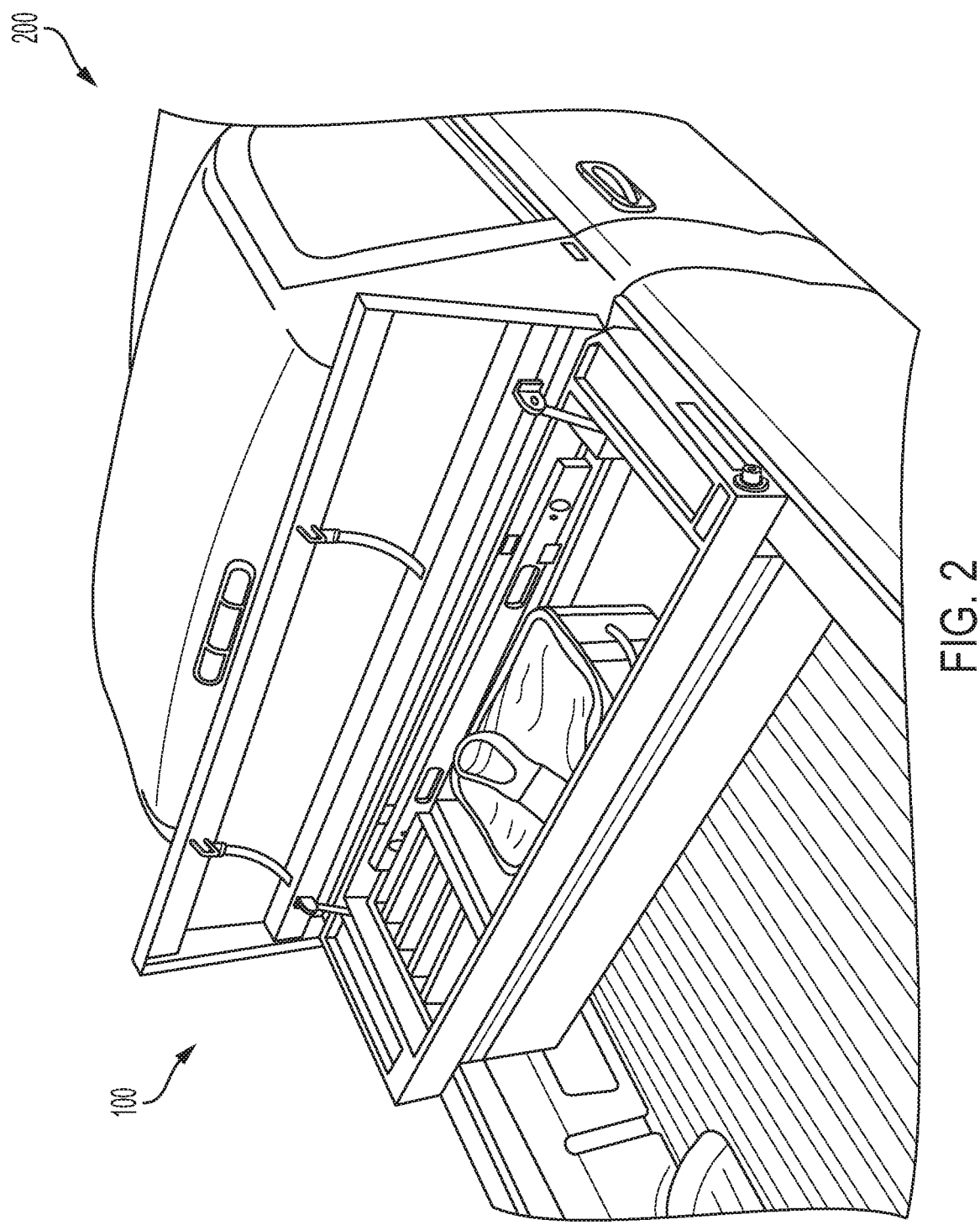
FIG. 2 is a perspective view of the truck storage box shown in FIG. 1 positioned within a pickup truck.

Referring to FIGS. 1 and 2, an example truck storage box 100 which can be positioned within the bed of a pickup truck 200 is disclosed. The truck box 100 includes a body 102 and a lid 104. The lid 104 is connected to the body via a hinge (not shown). In some embodiments, when the lid 104 is opened, a magnetic switch 106 mounted within the truck box is actuated. Upon actuation, the magnetic switch 106 interacts with magnet 108 to allow power from the trailer electrical socket of the pickup truck (shown in FIG. 6) to travel through a wire 109 and into the truck box 100 through pass-through grommet 110 to a series of LEDs, such as through an LED strip 112, which are mounted in the truck box 100 and are positioned to illuminate the inside of the truck box 100.

Figure 3:
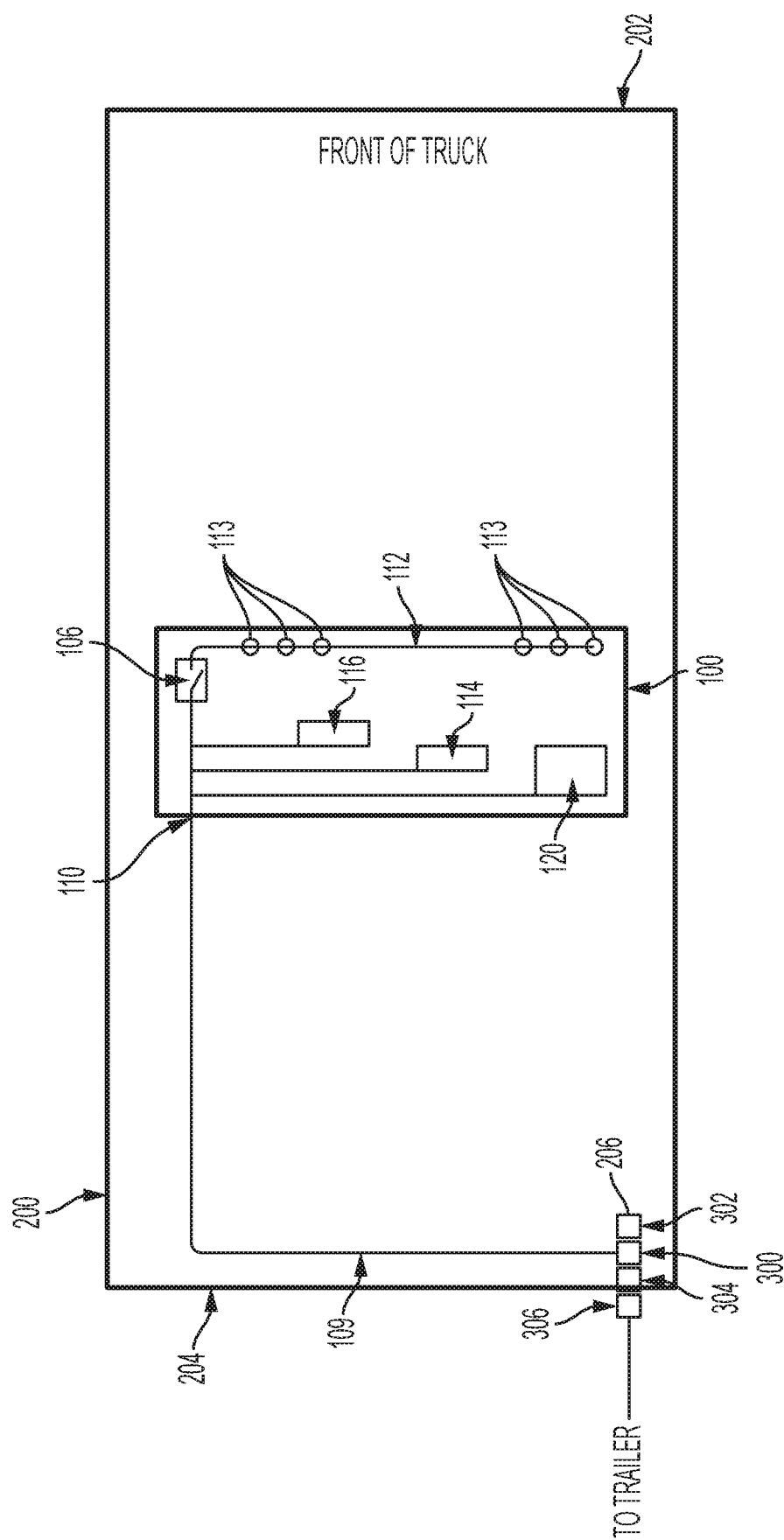
FIG. 3 is a schematic diagram of the pickup truck and truck storage box shown in FIG. 1.

FIG. 3 shows an example schematic diagram of the pickup truck 200 and truck storage box 100 positioned therein. The truck 200 has a front portion 202 and a rear bumper 204. In one embodiment, a power supply wire connector 300 is positioned between a 7-pin truck wire harness connector 302 and a truck 7-pin connector 304 mounted in the rear truck bumper 204. A trailer 7-pin connector 306, if present, connects to the outboard side of the truck 7-pin connector 304. This connection is described in more detail below with reference to FIGS. 6 and 7. In the case where a truck is not equipped with a trailer package, the end user will have to wire, either by splicing into the vehicle wiring system, connecting to the vehicle fuse box, connecting directly to the battery, or connecting to a different distribution point, such as in the cabin of the truck or in the engine compartment.

The power supply wire 109 leading from the power supply wire connector carries ground and 12V DC power forward through available passageways in the truck frame and bed. The power supply wire 109 enters the truck box through the pass-through grommet 110. The power supply wire 109 passes through the magnetic switch 106 to provide power to a series of LEDs 113 located within the truck box 100, such as through an LED strip 112.

FIG. 3 shows three other possible routes within the truck box 100 along which DC power may be directed. All, none, or some of these optional routes may be present. In some example embodiments, DC power is used to charge a battery 120 mounted in the truck box. DC power could be routed to various electronics located within the truck box through a port or outlet 114. In some embodiments, example components that can use the power provided in the truck box are power tools (for charging), batteries, flasher/emergency lights, flash lights, mobile phone, tablet, laptop, GPS/Bluetooth devices/module (for location services), cooler, heater, auxiliary battery (for charging), an electrical air compressor, and the like. Additionally, DC power could be routed to a series of standard outlets 116, such as USB ports and cigarette lighter type sockets. Each of these routings would have switches to disconnect the DC power if desired.

Figure 4:
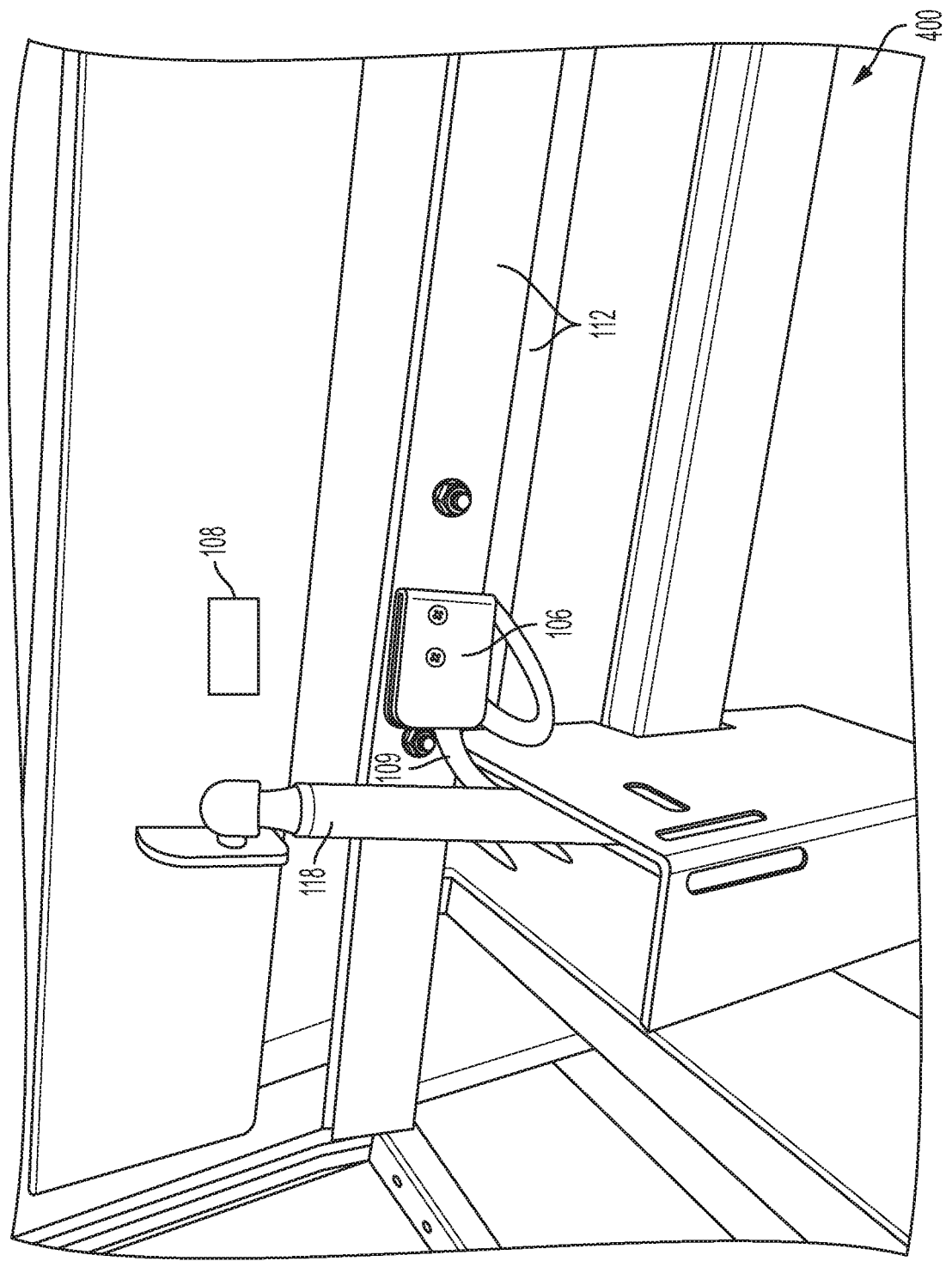
FIG. 4 is a close-up view of the interior of the truck storage box shown in FIG. 1.

FIG. 4 shows close-up view of the interior 400 of the truck storage box 100 shown in FIG. 1. One or more gas springs 118 may be located in the interior of the truck box 100 to assist in lifting the lid 104 of the truck box, as well as maintain the lid in the open position. In some embodiments, a magnetic switch 106, such as a magnetic reed switch, is mounted on an interior wall of the body of the truck box 100 near the gas spring 118. The magnetic switch 106 is an electrical switch that switches to an open or closed position based on the magnet 108 that is placed near the switch and provides a magnetic field. In one embodiment, the magnetic switch 106 is mounted on the body 102 of the truck box (to part of the light assembly) and the magnet 108 is mounted on the lid 104. The magnet 108 aligns to the magnet switch 106 based on the orientation of the lid and switches on or off the electrical circuit that is part of the light assembly 112, thereby allowing lights to turn on or off. The magnetic switch 106 is activated by opening the lid 104 of the truck box 100, which then allows power to pass through the wire 109 to the support strip 112 and illuminate the LEDs 113.

Figure 5:
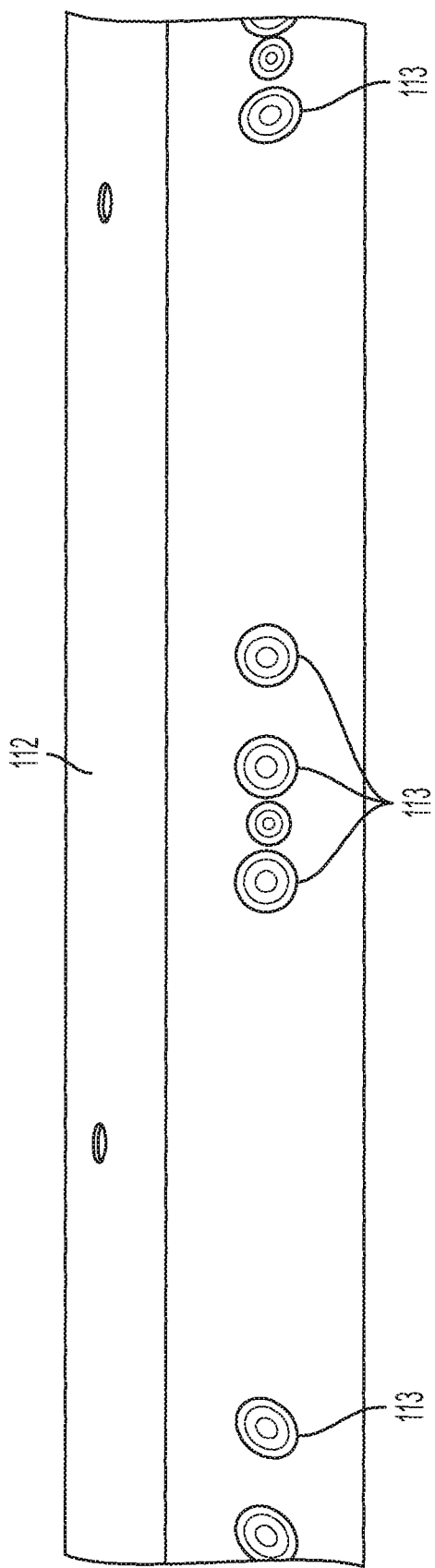
FIG. 5 is a close-up view of an example light assembly for use with the truck storage box shown in FIG. 1.

In addition, the power supply wire 109 connects the magnetic switch 106 to a trailer electrical socket of the vehicle, as described in more detail below. The power supply wire also connects the magnetic switch to a light assembly, which comprises a series of LEDs 113 mounted within a support strip 112. The light assembly is located in the interior of the truck box 100, as shown in FIG. 5. In some embodiments, the support strip 112 is mounted in a location in the back part of the body of the truck box, such as over the hinge of the truck box 100. This location evenly distributes the light inside the box. In alternate embodiments, the light assembly 112, 113 can be mounted anywhere in the body of the truck box as long as the magnetic switch 106 and the magnet 108 on the lid can align for proper operation. Additionally, the support strip 112 protects the LED lights 113 and assembly from any of the tools, material, or other items that a user may store in the truck box 100.

FIG. 5 shows a close-up view of an example light assembly for use with the truck storage box shown in FIG. 1. The light assembly includes the LEDs 113 mounted within the support strip 112. A plurality of LEDs 113 are placed in a variety of locations along the strip 112. Although a series of three LEDs are shown in succession, it should be understood that any number of LEDs may be present in any configuration on the support strip. The support strip 112 may be made of aluminum, for example, and can be mounted onto the interior of the truck box 100 by a fastening device such as, for example screws, glue, mechanical snaps, clips, welding, bolts, nuts, and the like. In alternate embodiments, the support strip 112 can be made of steel, plastic, or any polymer, or any other material except for a material that produces a magnetic field, so as to not interfere with the magnetic switch 106.

Figure 6:
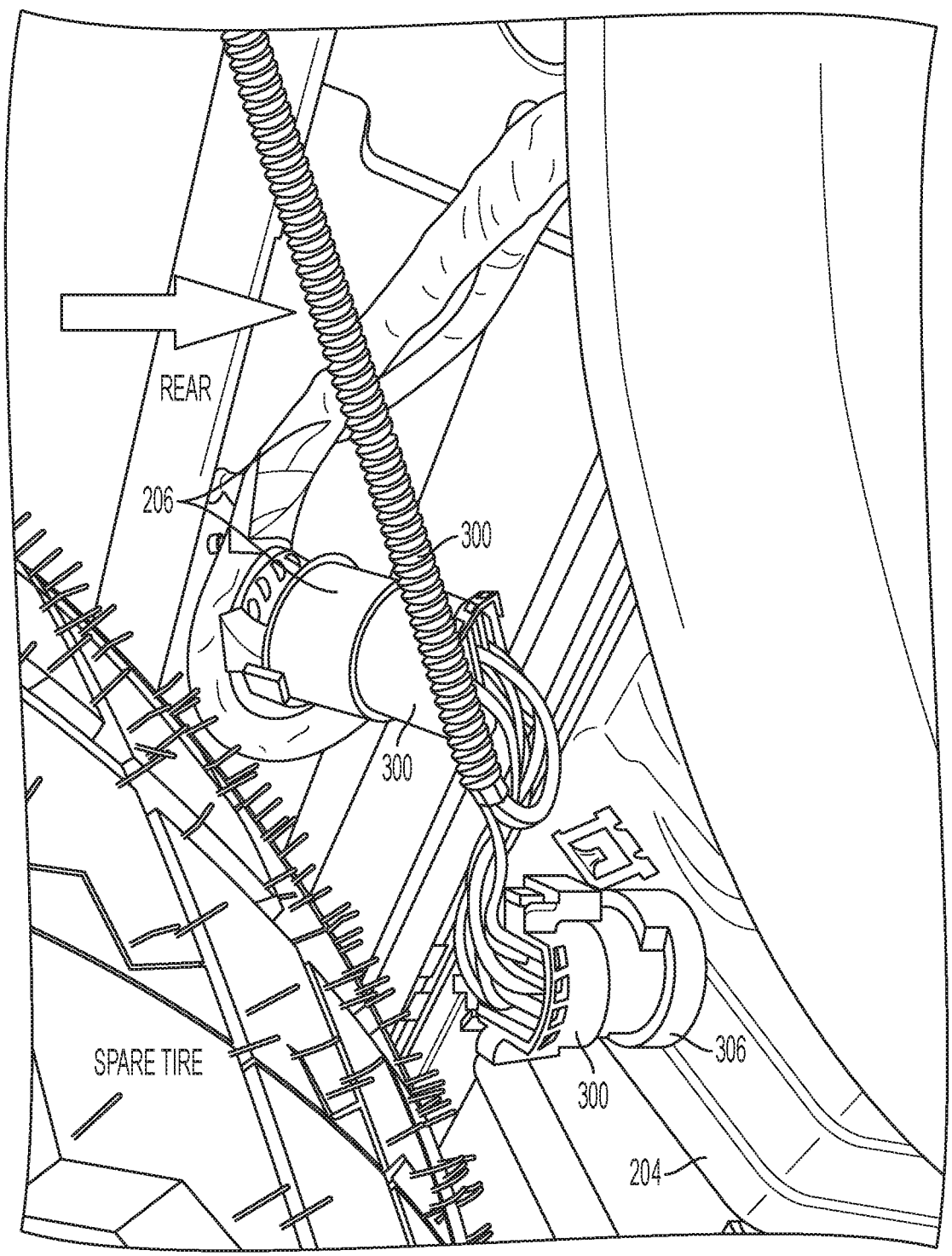
FIG. 6 is a close-up view of an example wiring arrangement in accordance with an embodiment.
Figure 7:
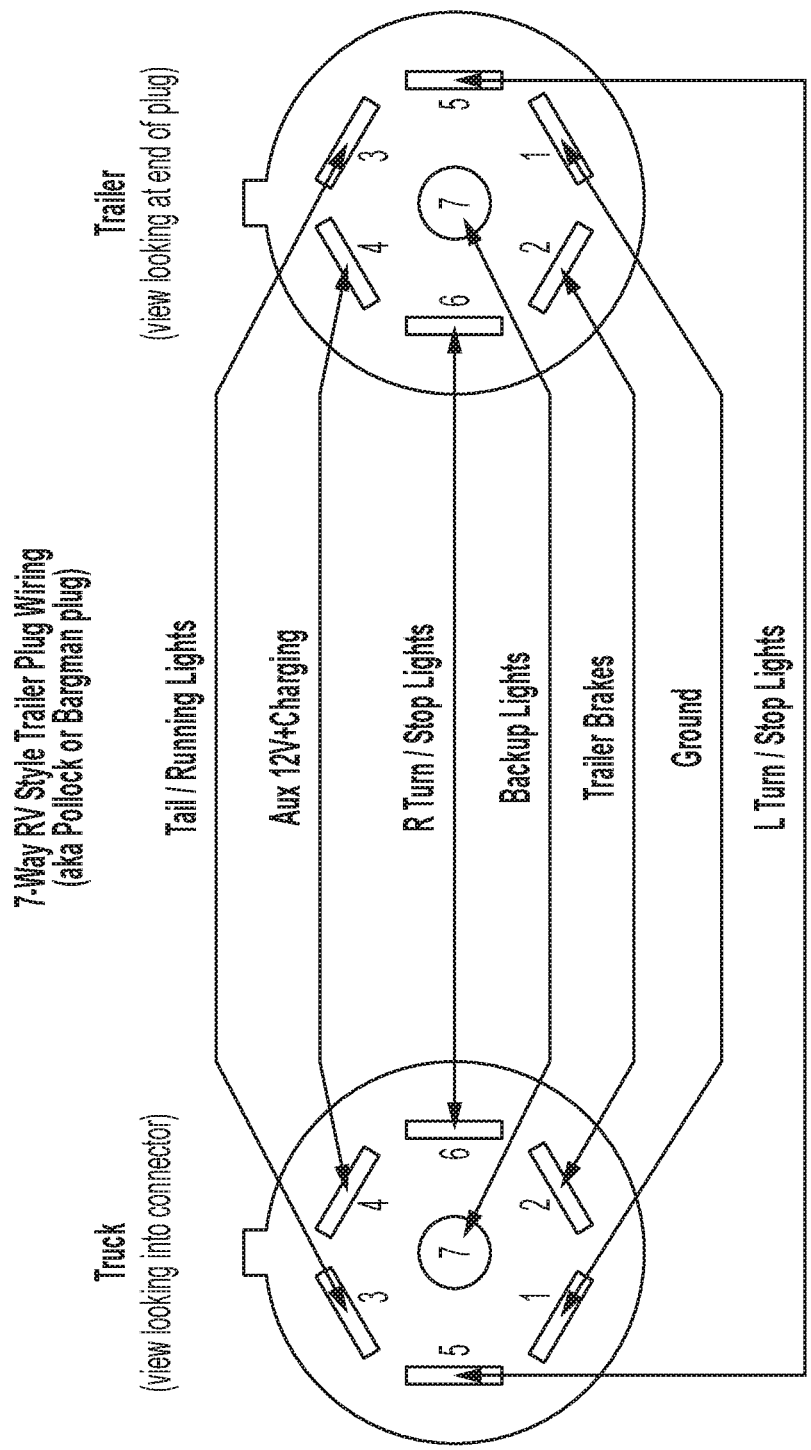
FIG. 7 is an example wiring diagram for use with the truck storage box shown in FIG. 1.

FIGS. 6 and 7 show components of the power supply wire connector 300 when installed in a pickup truck 200 and trailer plug wiring. The power supply wire connector 300 connects the truck wire harness 206 to the bumper connector 304 and draws electrical power for use in the truck box 100. FIG. 7 shows a wiring diagram for use with the truck storage box shown in FIG. 1. The wiring diagram is for the current USCAR/SAE standard for a trailer hitch plug followed by trucks sold with a towing package in the US and Canada. As shown in FIG. 7, 12V of DC power is available between pins 1 and 4.

Figure 8:
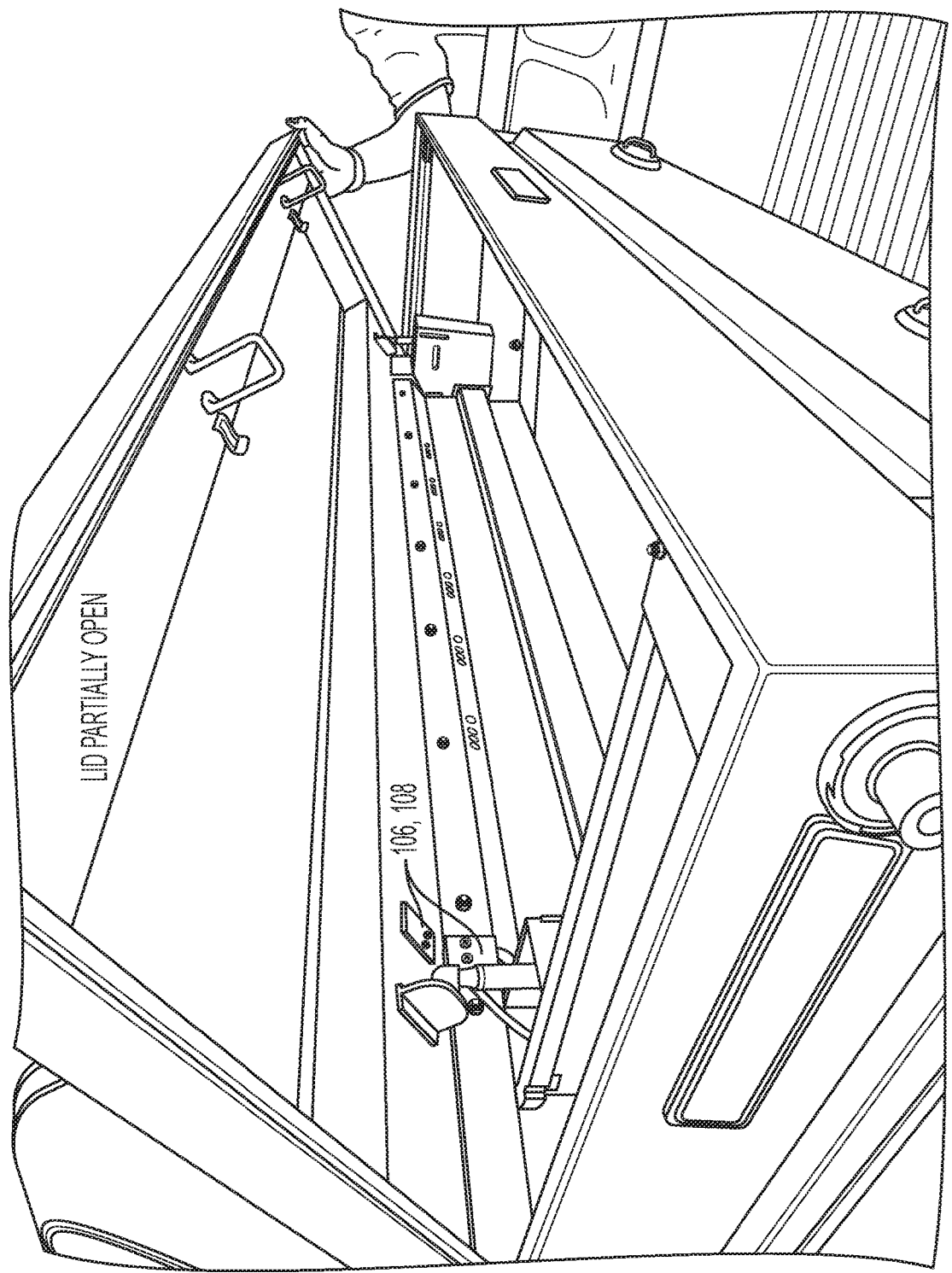
FIG. 8 is perspective view of the truck storage box shown in FIG. 1 with the lid partially open.

FIG. 8 is a perspective view of the truck storage box 100 shown in FIG. 1 with the lid 104 partially open and the LEDs 113 not lit. When the lid is closed, even partially, the magnet 108 will be outside of the switch 106 sensing distance, so the switch 106 will not be activated to power the light assembly 112, 113.

Figure 9:
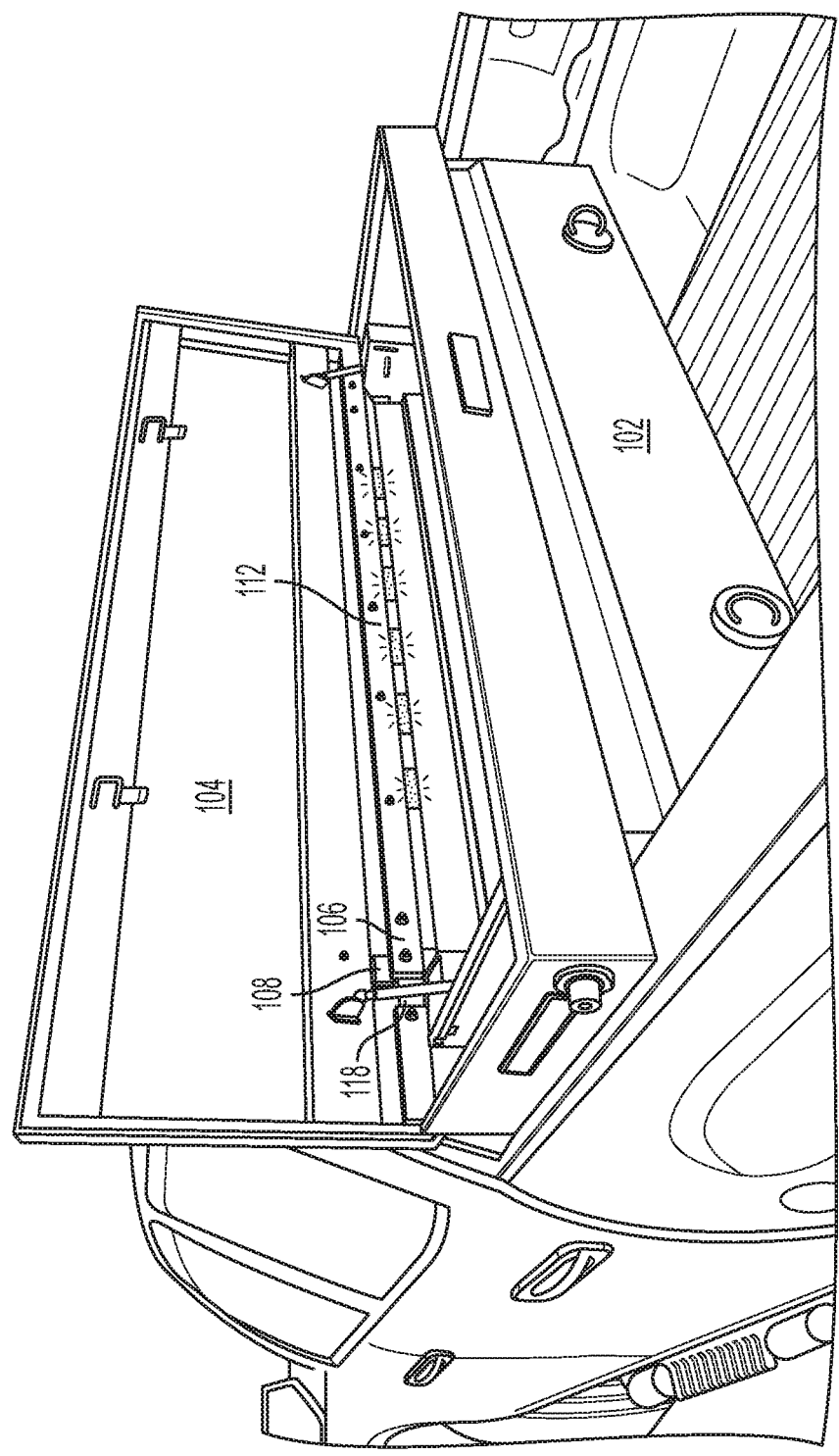
FIG. 9 is perspective view of the truck storage box shown in FIG. 1 with the lid fully open.

FIG. 9 is perspective view of the truck storage box shown in FIG. 1 with the lid 104 fully open and the LEDs 113 lit. When the truck box lid 104 is fully open, the magnet 108 mounted on the lid is within the pre-determined proximity or distance from the switch 106 that triggers the switch and activates the light assembly.

In other embodiments, the magnet and magnetic switch may be replaced with alternate means of actuation, such as a mechanical actuating switch, a photo cell switch, a proximity switch, and the like.

The LEDs 113 and the support strip 112 may be provided installed in the truck box 100, or could be sold as an after-market item which can be easily mounted in the truck box 100 using the lid hinge fasteners.

The present application provides a number of advantages, including the ease of availability of electrical power. Additionally, the method of connection through the existing trailer hitch electrical socket makes it less likely that electrical continuity at wiring harness splices will be compromised by the effect of water, salt, and the like.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A truck storage box comprising:
    an outer body, an interior, and a lid, the lid being connected to the outer body by a hinge;
    a magnetic switch mounted within the interior;
    a magnet secured to the lid;
    an LED strip removeably secured to the interior, wherein the LED strip is powered by a trailer electrical socket in communication with the truck storage box; and a wire configured to carry DC power to the interior of the truck storage box from the trailer electrical socket, wherein the wire passes through the magnetic switch and into the LED strip;

wherein the magnetic switch is activated by opening the lid of the truck storage box.

2. The truck storage box of claim 1, wherein the LED strip includes a plurality of LEDs.

3. The truck storage box of claim 1, wherein the LED strip is mounted over the hinge.

4. The truck storage box of claim 1, wherein the DC power is routed to one or more components within the truck storage box through a port or outlet.

5. The truck storage box of claim 4, wherein the one or more components comprise power tools, batteries, emergency lights, flash lights, a mobile phone, a tablet, a laptop, a location services device, a cooler, a heater, or an air compressor.

6. The truck storage box of claim 1, wherein the wire enters the truck storage box through a pass-through grommet in the body of the truck storage box.

7. The truck storage box of claim 1, further comprising at least one gas spring within the interior of the truck storage box.

8. The truck storage box of claim 1, wherein the trailer electrical socket is a 7-pin connector.

9. The truck storage box of claim 1, wherein the magnetic switch is a magnetic reed switch.

10. A method of providing power to a truck storage box comprising:

providing a truck storage box having a body defining an interior, and a lid, the lid being connected to the body by a hinge, the box further including a magnetic switch mounted within the interior, a magnet secured to the lid, and an LED strip removeably secured to the interior of the truck storage box;

connecting the interior of the truck storage box to a 7-pin trailer electrical socket; and providing DC power to the LED strip via a wire from the 7-pin trailer electrical socket;

wherein when the lid is in an open position, the magnetic switch interacts with the magnet to provide power to activate the LED strip, and when the lid is in a closed position, the magnetic switch does not interact with the magnet, thereby preventing power from activating the LED strip.

11. The method of claim 10, further comprising providing DC power to one or more components within the truck storage box through a port or outlet.

12. The method of claim 11, wherein the one or more components comprise power tools, batteries, emergency lights, flash lights, a mobile phone, a tablet, a laptop, a location services device, a cooler, a heater, or an air compressor.

13. The method of claim 10, wherein the LED strip includes including a plurality of LEDs.

14. The method of claim 10, further comprising positioning the truck storage box within a bed of a pickup truck.

\* \* \* \* \*